United States Patent [19]
Kränzler

[11] Patent Number: 4,638,196
[45] Date of Patent: Jan. 20, 1987

[54] HAND-HELD TOOL WITH AN ELECTRIC MOTOR AND WEARING SHELLS FOR SUPPORTING THE SAME

[75] Inventor: Ernst Kränzler, Leinfelden-Echterdingen, Fed. Rep. of Germany

[73] Assignee: Robert Bosch GmbH, Stuttgart, Fed. Rep. of Germany

[21] Appl. No.: 713,264

[22] Filed: Mar. 18, 1985

[30] Foreign Application Priority Data

Apr. 7, 1984 [DE] Fed. Rep. of Germany ....... 3413233

[51] Int. Cl.$^4$ .......................... H02K 5/04; H02K 7/14; H02K 11/00
[52] U.S. Cl. .................................... 310/50; 310/68 R; 310/89; 310/90; 340/648
[58] Field of Search ...................... 310/42, 43, 47, 50, 310/89, 238, 239, 242, 90, 68 R; 340/648

[56] References Cited
U.S. PATENT DOCUMENTS

| | | | |
|---|---|---|---|
| 3,403,274 | 9/1968 | Robison | 310/90 |
| 3,479,540 | 11/1969 | Fox | 310/89 |
| 4,348,603 | 9/1982 | Huber | 310/50 |
| 4,420,702 | 12/1983 | Mixner | 310/43 |
| 4,471,251 | 9/1984 | Yamashita | 310/89 |
| 4,491,752 | 1/1985 | O'Hara et al. | 310/90 |
| 4,510,404 | 4/1985 | Barrett et al. | 310/50 |
| 4,546,280 | 10/1985 | Pflüger | 310/239 |

Primary Examiner—Peter S. Wong
Assistant Examiner—D. L. Rebsch
Attorney, Agent, or Firm—Michael J. Striker

[57] ABSTRACT

In a hand-held machine tool, a housing formed of two shells accommodates an electric motor, a motor bearing assembly and electric structural components. A brush-side motor bearing includes a bearing support which carries thereon the electric structural components, such as carbon brush holders, chokes for spark quenching, an inductive receiver and light-emitting diodes. The bearing support can be preassembled with these structural components outside the housing and inserted into one of the housing shells.

6 Claims, 1 Drawing Figure

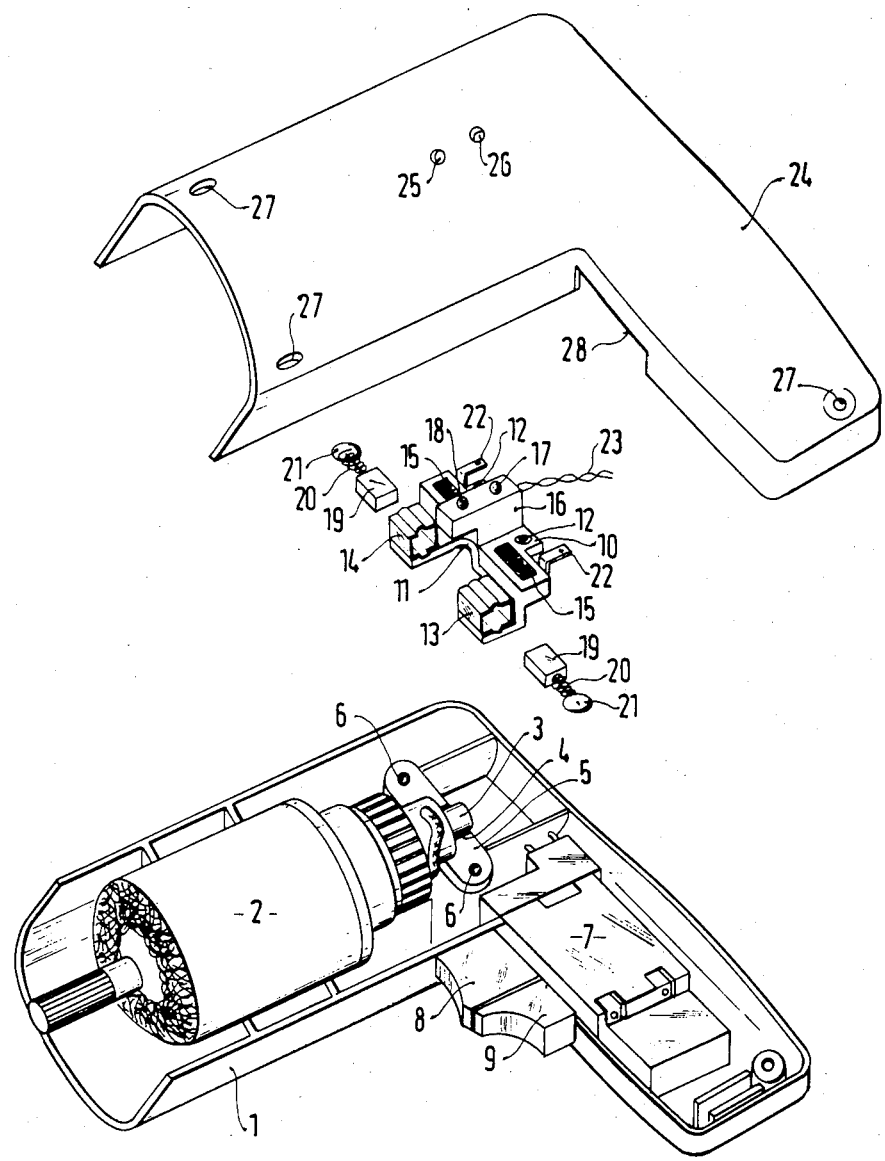

HAND-HELD TOOL WITH AN ELECTRIC MOTOR AND WEARING SHELLS FOR SUPPORTING THE SAME

BACKGROUND OF THE INVENTION

The present invention pertains to a hand-held machine tool in general, and more particularly to a hand-held machine tool, the housing of which is formed of two shells connectable to each other.

Hand-held machine tools of the type under consideration have been known. Such tools have two housing shells which simultaneously receive two shell bearing halves or are formed as two bearing shell halves. In the housing shells are inserted electric structural components of the tool, such as an electric motor, brush holders, choke coils for spark quenching and spark shielding, indication lamps and the like. Thereby a shape of each housing shell results which is made by injection molding but is, however, difficult to control and which is very expensive. The motor bearings are first assembled by assembling the housing shells, and the motor can be set into operation only after the housing has been closed. This makes it difficult to determine errors because visible access to the motor bearings and electric structural components during operation is not possible. The wiring of the separately positioned electric structural components must take place after the insertion of these components into the housing. This procedure is time-consuming and requires specific skills to control the tool. Furthermore, if a wiring mess occurs it is not visible. Manufacturing errors are difficult to discover whereby possible standards must be increased. Bolting connections required for a reliable supporting in the vicinity of the bearings require bolt holes in the region of the grip of the hand-held tool, which is disturbing in practice.

SUMMARY OF THE INVENTION

It is an object of the present invention to provide an improved hand-held machine tool assembly.

It is another object of the invention to provide a hand-held machine tool which would have a subassembly which could be assembled outside the housing and then inserted thereinto.

These and other objects of the invention are attained by a hand-held machine tool including a housing having housing shells connectable to each other, an electric motor and a motor bearing assembly accommodated in said housing, and electric structural components, said motor bearing assembly having a brush-side motor bearing portion including a removable bearing support which is simultaneously a carrier of said electric structural components.

The chief advantage of the hand-held tool of this invention resides in the fact that a compact subassembly or structural group or "bearing support" or "bridge" can be assembled outside the housing shells. Due to the tool assembly of this invention also short electric lead passages would result, which would shorten a reaction time for spark quenching and suppress interference radiation of electromagnetic waves.

The invention eliminates the above described disadvantage of interference location of conventional hand-held tools of the foregoing type. The invention ensures that the manufacturing of the housing shells by injection molding would be facilitated and the use of the grip would be favorable because the bolts for connecting the housing shells to each other in the region of the grip can be omitted.

The structural components carried by the bearing support may be an upper bearing shell, carbon brush holders and choke coils for spark shielding and spark quenching.

The structural components carried by the bearing support may further include an inductive receiver for a device for controlling a number of revolutions of said electric motor, and light-emitting diodes for indicating electrically switchable number of revolutions of said motor.

These components may further include portions of plug contacts.

It is particularly advantageous that the indication device and the inductive receiver are assembled in a single subassembly group.

The bearing support with the structural components thereon can be easily removed from the housing.

The carbon brush holders and the choke coils may be switchable to be immediately connected to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE of the drawing illustrates an exploded perspective view of the hand-held machine tool having a motor portion and a grip portion to be pulled one onto another.

DETAILED DESCRIPTION OF THE PREFERRED EMBODIMENT

The only FIGURE of the drawing shows two shells of the housing of the hand-held machine tool comprising a number of individual groups, of which the first group is a housing shell with a motor and switch elements positioned therein, the second group is a bearing support assembly, and the third group is the second housing shell.

Reference numeral 1 designates a first housing shell in which a motor 2 is positioned. Motor 2 has a shaft the brush-side end 3 of which is supported in a shell half 4 of a bearing box 5. The bearing box 5 is provided with threaded holes 6. In the grip portion of the housing shell 1 is secured a double switch 7 which has two switch handles 8 and 9 positioned outside the tool housing. A non-illustrated but conventional electric service cable is connected to the double switch 7. This service cable is inserted into the housing of the tool in the usual fashion from the underside of the hand grip portion.

A half shell 11 of a bearing support or bridge 10 forms together with the bearing box 5 a bearing for the end 3 of the motor shaft. Two through openings 12 are provided in the bearing support 10 for screwing the bearing support to the bearing box 5. Two carbon brush holders 13 and 14 are secured to the bearing support 10. The latter further carries two choke coils 15 for spark shielding and spark quenching and an inductive receiver 16 with two light-emitting diodes 17 and 18. Two carbon brushes 19 with compression springs 20 and supporting plates 21 are insertable in the carbon brush holders 13 and 14. Plugs 22 provided on the bearing bridge 10 serve for connecting carbon brushes 19 to the double switch 7 via the chokes 15. Required conductor connections are manufactured and assembled in the usual manner and are not shown herein. Connecting wires 23 of the receiver 16 lead eventually to a non-shown evaluation circuit.

A second housing shell 24 includes openings 25 and 26 through which light-emitting diodes 17 and 18 are visible. The housing shell 24 further has through bores 27 with countersinks. Bolts for fastening the housing shells 1 and 24 to each other can pass through bores 27. A recess 28 is provided on the side wall of the housing shell 24, into which switch handles 8 and 9 partially extend in the assembled portion of the hand-held tool.

The bearing support assembly or group which comprises the bearing bridge 10, half shell 11, carbon brush holders 13 and 14, choke coils 15 and inductive receiver 16 with light-emitting diodes 7 and 18, can be preassembled as an independent assembly or group and can be examined outside the housing. By screwing the bearing support or bridge 10 to the bearing box 5 the shaft end 3 is rotatably positioned in the bearing having the half shells 4 and 11, Thereby, at the same time carbon brushes 19, chokes 15 and receiver 16 with light-emitting diodes 17, 18, connected in series are brought to an operational position. To replace one of these elements the whole bearing support assembly is merely removed from the housing of the tool. The light-emitting diodes 17 and 18 indicate to which one of two selected stages of number of revolutions motor 2 is switched by one of the switch handles 8 or 9. The housing shell 24 merely has a protective function and is not required for the operation of the motor. If housing shell 24 is taken off the functions of the motor 2, carbon brushes 19, bearing 5/10 and light-emitting diodes 17, 18 can be examined by visual control. It can be also examined as to whether all electrical connections are satisfactory.

It will be understood that each of the elements described above, or two or more together, may also find a useful application in other types of hand-held machine tools differing from the types described above.

While the invention has been illustrated and described as embodied in a hand-held machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand-held machine tool including a housing having housing shells connectable to each other, an electric motor, and a split motor bearing accommodated in said housing and including a lower shell half and an upper shell half connectable to an disconnectable from said lower shell half, both shell halves supporting in assembly a brush-side end of a motor shaft; and electric structural components, said lower shell half being secured in said housing and remaining therein whereas said upper shell half is simultaneously a carrier for supporting said electric structural components and forms with said electric structural components a pre-assembled integral component assembly removable from and insertable into said housing.

2. The machine tool as defined in claim 1, wherein said upper shell half carries carbon brush holders, carbon brush insertable into said holders and choke coils for spark shielding and spark quenching.

3. The machine tool as defined in claim 2, wherein said upper shell half carries an inductive receiver for a device for controlling the number of revolutions of said electric motor.

4. The machine tool as defined in claim 3, wherein said upper shell half carries light-emitting diodes for indicating the electrically switchable number of revolutions of said motor.

5. The machine tool as defined in claim 4, wherein said upper shell half portions of plug contacts.

6. The machine tool as defined in claim 2, wherein the carbon brushes are connectable to respective choke coils in said upper shell half.

* * * * *